US011181566B2

United States Patent
Xue et al.

(10) Patent No.: US 11,181,566 B2
(45) Date of Patent: Nov. 23, 2021

(54) DETECTION CIRCUIT OF ELECTROMAGNETIC FAULT INJECTION AND SECURITY CHIP

(71) Applicant: SHENZHEN GOODIX TECHNOLOGY CO., LTD., Shenzhen (CN)

(72) Inventors: Jianfeng Xue, Shenzhen (CN); Jiang Yang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/025,823

(22) Filed: Sep. 18, 2020

(65) Prior Publication Data

US 2021/0048466 A1 Feb. 18, 2021

Related U.S. Application Data

(63) Continuation of application No. PCT/CN2019/101081, filed on Aug. 16, 2019.

(51) Int. Cl.
*G01R 31/00* (2006.01)
*G01R 31/28* (2006.01)
*H01L 23/60* (2006.01)

(52) U.S. Cl.
CPC ....... *G01R 31/001* (2013.01); *G01R 31/2879* (2013.01); *H01L 23/60* (2013.01)

(58) Field of Classification Search
CPC .............. G01R 31/001; G01R 31/2879; G01R 29/0814; G01R 31/002; H01L 23/60;
(Continued)

(56) References Cited

U.S. PATENT DOCUMENTS

| 10,361,164 B2 | 7/2019 | Ordas et al. |
| 2018/0005964 A1 | 1/2018 | Ordas et al. |

(Continued)

FOREIGN PATENT DOCUMENTS

| CN | 102565514 A | 7/2012 |
| CN | 103034804 A | 4/2013 |

(Continued)

OTHER PUBLICATIONS

Briais, Sebastien, et al. "Random Active Shield," Author manuscript, published in "Fault Diagnosis and Tolerance in Cryptography, Leuven : Belgium (2012)," Jul. 27, 2012, 12 Pages.

(Continued)

*Primary Examiner* — Giovanni Astacio-Oquendo

(57) ABSTRACT

A detection circuit of electromagnetic fault injection includes: a shielding layer configured to shield interference; at least one group of metal-oxide semiconductor MOS transistors, where a source end of the at least one group of MOS transistors is connected to the shielding layer; at least one latch, where a drain end of the at least one group of MOS transistors is connected to an input end of the at least one latch; and a signal output module, where an input end of the signal output module is connected to an output end of the at least one latch. The detection circuit could detect in real time and alarm electromagnetic fault injection in time to ensure robustness and safety of a chip.

20 Claims, 3 Drawing Sheets

(58) Field of Classification Search
CPC ... H01L 23/573; H01L 23/5225; H04L 9/004; G06F 21/87; G06F 21/75
USPC ........................................ 324/537, 531, 500
See application file for complete search history.

(56) References Cited

U.S. PATENT DOCUMENTS

| | | | |
|---|---|---|---|
| 2021/0109163 A1* | 4/2021 | Kelly | G01R 31/52 |
| 2021/0150027 A1* | 5/2021 | Sonntag | G06F 21/755 |
| 2021/0215750 A1* | 7/2021 | Federley | G01R 29/0814 |

FOREIGN PATENT DOCUMENTS

| | | |
|---|---|---|
| CN | 105391542 A | 3/2016 |
| CN | 107563191 A | 1/2018 |
| CN | 107942154 A | 4/2018 |
| FR | 2985059 A1 | 6/2013 |

OTHER PUBLICATIONS

Xuan Thuy Ngo et al. "Cryptographically Secure Shield for Security IPs Protection," IEEE Transactions on Computers, Feb. 1, 2017, 66(2):354-360, 8 pages.

Daisuke Ishihata et al. "Enhancing reactive countermeasure against EM attacks with low overhead" 2017 IEEE International Symposium on Electromagnetic Compatibility & Signal/Power Integrity (EMCSI). IEEE, Aug. 1, 2017, 6 pages.

Ghodrati, Marjan, "Thwarting Electromagnetic Fault Injection Attack Utilizing Timing Attack Countermeasure," Thesis submitted to the Faculty of the Virginia Polytechnic Institute and State University in partial fulllment of the requirements for the degree of Master of Science in Computer Engineering, Dec. 15, 2017, 83 pages.

Possamai Bastos Rodrigo et al:"Architectures of bulk built-in current sensors for detection of transient faults in integrated circuits". Microelectronics Journal. Mackintosh Publications Ltd. Luton. GB. vol. 71. Dec. 5, 2017, pp. 70-79.

David El-Baze et al: "A fully-digital EM pulse detector".DESIGN. AUTOMATION & Test in Europe. EDA Consortium. 111 West Saint John Street.Suite 220 San Jose CA 95113 USA. Mar. 14, 2016 (Mar. 14, 2016). pp. 439-444.XP058279346.

\* cited by examiner

DETECTION CIRCUIT OF ELECTROMAGNETIC FAULT INJECTION AND SECURITY CHIP

CROSS REFERENCE TO RELATED APPLICATIONS

The present disclosure is a continuation of international application No. PCT/CN2019/101081, filed on Aug. 16, 2019, which is hereby incorporated by reference in its entirety.

TECHNICAL FIELD

Embodiment of the present disclosure relate to the field of electronics, and more particularly, to a detection circuit of electromagnetic fault injection, a security chip and an electronic device.

BACKGROUND

A security chip may be used to implement functions such as user identity identification and key data storage, and it is widely applied to the field of finance and is a key attack object of an attacker. By injecting a fault to cause a working state of the chip to be wrong, the attacker obtains confidential data of the chip.

Electromagnetic fault injection (EMFI) is a novel security chip attack means. By placing a magnetic field probe on a surface of a chip, an attacker may inject electromagnetic radiation into part of the chip, resulting in generation of an incorrect timing sequence and abnormal flip for a circuit, so that a system enters an abnormal working state, causing leakage of key information of the chip.

Therefore, there is an urgent need for a detection circuit in the field to detect in real time and alarm electromagnetic fault injection in time, thereby ensuring robustness and safety of a chip.

SUMMARY

Embodiments of the present disclosure provide a detection circuit of electromagnetic fault injection, a security chip and an electronic device, which could detect in real time and alarm electromagnetic fault injection in time, thereby ensuring robustness and safety of the chip.

In a first aspect, a detection circuit of electromagnetic fault injection is provided, including:

a shielding layer configured to shield interference;

at least one group of metal-oxide semiconductor MOS transistors, where a source end of the at least one group of MOS transistors is connected to the shielding layer;

at least one latch, where a drain end of the at least one group of MOS transistors is connected to an input end of the at least one latch; and a signal output module, where an input end of the signal output module is connected to an output end of the at least one latch, the signal output module is configured to generate and output a target signal based on a voltage change at the output end of the at least one latch, and the target signal is used to indicate whether there is electromagnetic fault injection in the shielding layer;

where when some or all MOS transistors of the at least one group of MOS transistors is turned on, the signal output module is configured to output s first target signal, and the first target signal is used to indicate that there is electromagnetic fault injection in the shielding layer; and when the at least one group of MOS transistors are each turned off, the signal output module is configured to output a second target signal, and the second target signal is used to indicate that there is no electromagnetic fault injection in the shielding layer.

The at least one group of MOS transistors could detect whether an abnormal voltage occurs in the shielding layer, a latch corresponding to the at least one group of MOS transistors could output a detection signal that could be identified by a signal output module 15, and thus electromagnetic fault injection is detected in real time and alarmed in time to ensure robustness and safety of a chip.

In addition, the detection circuit of electromagnetic fault injection is designed based on the shielding layer, which could achieve the purposes of effectively simplifying a circuit structure, saving a circuit area, avoiding occurrence of static power consumption, reducing circuit costs, and the like.

In some possible embodiments, a drain end of a first group of MOS transistors of the at least one group of MOS transistors is connected to an input end of a first latch of the at least one latch, a gate end of the first group of MOS transistors is connected to a ground voltage, and the input end of the first latch is connected to a power supply voltage.

In some possible embodiments, the detection circuit further includes:

a first switch, where the input end of the first latch is connected to the power supply voltage through the first switch.

In some possible embodiments, a drain end of a second group of MOS transistors of the at least one group of MOS transistors is connected to an input end of a second latch of the at least one latch, a gate end of the second group of MOS transistors is connected to a power supply voltage, and the input end of the second latch is connected to a group voltage.

In some possible embodiments, the detection circuit further includes:

a second switch; and the input end of the second latch is connected to the ground voltage through the second switch.

In some possible embodiments, the detection circuit further includes:

a first inverter; and an output end of the second latch is connected to the input end of the signal output module through the first inverter, and the signal output module is configured to generate and output the target signal based on a voltage change at an output end of the first inverter.

In some possible embodiments, the shielding layer includes:

at least one metal wire; and the at least one metal wire is provided with at least one detection node, and the at least one detection node is connected to the input end of the at least one latch.

In some possible embodiments, the at least one group of MOS transistors are a plurality of groups of MOS transistors, and drain ends of different groups of MOS transistors of the plurality of groups of MOS transistors are connected to input ends of different latches.

In some possible embodiments, the at least one group of MOS transistors are a plurality of groups of MOS transistors, and different groups of MOS transistors of the plurality of groups of MOS transistors include different types of MOS transistors.

In some possible embodiments, each of the at least one latch includes:

a second inverter and a third inverter; and an input end of the second inverter is connected to an output end of the third inverter, an output end of the second inverter is connected to an input end of the third inverter, and the input end of the second inverter or the input end of the third inverter is an input end of the latch.

In some possible embodiments, the signal output module includes a first output end and a second output end, and output of the first output end and output of the second output end are inverse.

In some possible embodiments, the signal output module is a D flip-flop.

In a second aspect, a security chip is provided, including:

a transmitter configured to generate and output a first signal;

a shielding layer;

a receiver, where the receiver is connected to the transmitter through the shielding layer, and the receiver is configured to receive the first signal output by the transmitter through the shielding layer, and to output a second signal based on the first signal;

a digital processor, where the digital processor is connected to the transmitter and the receiver, respectively, and the digital processor is configured to receive the first signal output by the transmitter and the second signal output by the receiver, and determine whether the shielding layer is damaged based on the first signal and the second signal; and the detection circuit according to the first aspect or any one of possible embodiments of the first aspect.

where the shielding layer is the shielding layer in the detection circuit.

In a third aspect, an electronic device is provided, including the security chip according to the second aspect.

DESCRIPTION OF EMBODIMENTS

Technical solutions in embodiments of the present disclosure will be described below with reference to accompanying drawings.

Figure 1:
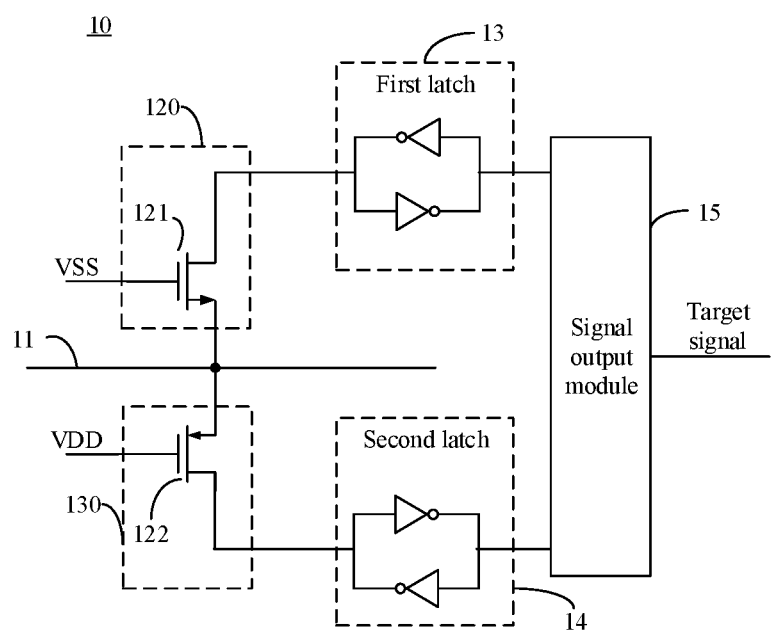
FIG. 1 is a schematic circuit diagram of a detection circuit of electromagnetic fault injection according to an embodiment of the present disclosure.

FIG. 1 is a schematic circuit diagram of a detection circuit 10 of electromagnetic fault injection according to an embodiment of the present disclosure.

With reference to FIG. 1, the detection circuit 10 may include a shielding layer 11, at least one group of metal-oxide semiconductor (MOS) transistors, at least one latch and a signal output module 15.

The shielding layer 11 is configured to shield interference, and it may be a shielding layer of an existing security chip or a shielding layer of any other device or component. A source end of the at least one group of MOS transistors is connected to an input end of the at least one latch. An input end of the signal output module 15 is connected to an output end of the at least one latch, the signal output module 15 is configured to generate and output a target signal based on a voltage change at the output end of the at least one latch, and the target signal is used to indicate whether there is electromagnetic fault injection in the shielding layer 11. When some or all MOS transistors of the at least one group of MOS transistors is turned on, the signal output module 15 is configured to output a first target signal, and the first target signal is used to indicate that there is electromagnetic fault injection in the shielding layer 11. When the at least one group of MOS transistors are each turned off, the signal output module 15 is configured to output a second target signal, and the second target signal is used to indicate that there is no electromagnetic fault injection in the shielding layer 11.

In other words, the signal output module 15 may be configured to output a first target signal in a case that some or all MOS transistors of the at least one group of MOS transistors is turned on, and to output a second target signal in a case that the at least one group of MOS transistors are each turned off. The first target signal is used to indicate that there is electromagnetic fault injection in the shielding layer 11, and the second target signal is used to indicate that there is no electromagnetic fault injection in the shielding layer 11.

The at least one group of MOS transistors could detect whether an abnormal voltage occurs in the shielding layer, a latch corresponding to the at least one group of MOS transistors could output a detection signal that could be identified by the signal output module 15, and thus electromagnetic fault injection is detected in real time and alarmed in time to ensure robustness and safety of a chip.

In addition, the detection circuit of electromagnetic fault injection is designed based on the shielding layer, which could achieve the purposes of effectively simplifying a circuit structure, saving a circuit area, avoiding occurrence of static power consumption, reducing circuit costs, and the like.

In some embodiments of the present disclosure, a drain end of a first group of MOS transistors 120 of the at least one group of MOS transistors may be connected to an input end of a first latch of the at least one latch, a gate end of the first group of MOS transistors 120 may be connected to a ground voltage, and the input end of the first latch may be connected to a power supply voltage. The first group of MOS transistors 120 may be configured to detect whether an abnormal phenomenon that a voltage value is lower than a ground voltage occurs in the shielding layer 11.

With continuing reference to FIG. 1, in an example that the first group of MOS transistors 120 include a first NMOS transistor 121, a gate of the first NMOS transistor 121 is connected to the ground voltage, a source of the first NMOS transistor 121 is connected to the shielding layer 11, and a drain end of the first NMOS transistor 121 is connected to a first latch 13.

It is assumed that there is electromagnetic fault injection in the shielding layer 11. The shielding layer 11 may generate an induced current so that a voltage of the shielding layer 11 changes, thereby causing that a voltage range of the shielding layer 11 exceeds VSS~VDD. In this case, if a difference between the VSS and the voltage of the shielding layer 11 is greater than or equal to a threshold voltage of the first NMOS transistor 121, the first NMOS transistor 121 is turned on, thereby causing that a voltage at an input end of the first latch 13 decreases. The decrease of the voltage at the input end of the first latch 13 causes an increase of a voltage at an output end of the first latch 13. The signal output module 15 outputs the first target signal for indication according to a voltage change at the output end of the first latch 13, so as to indicate that there is electromagnetic fault injection in the shielding layer 11.

Figure 2:
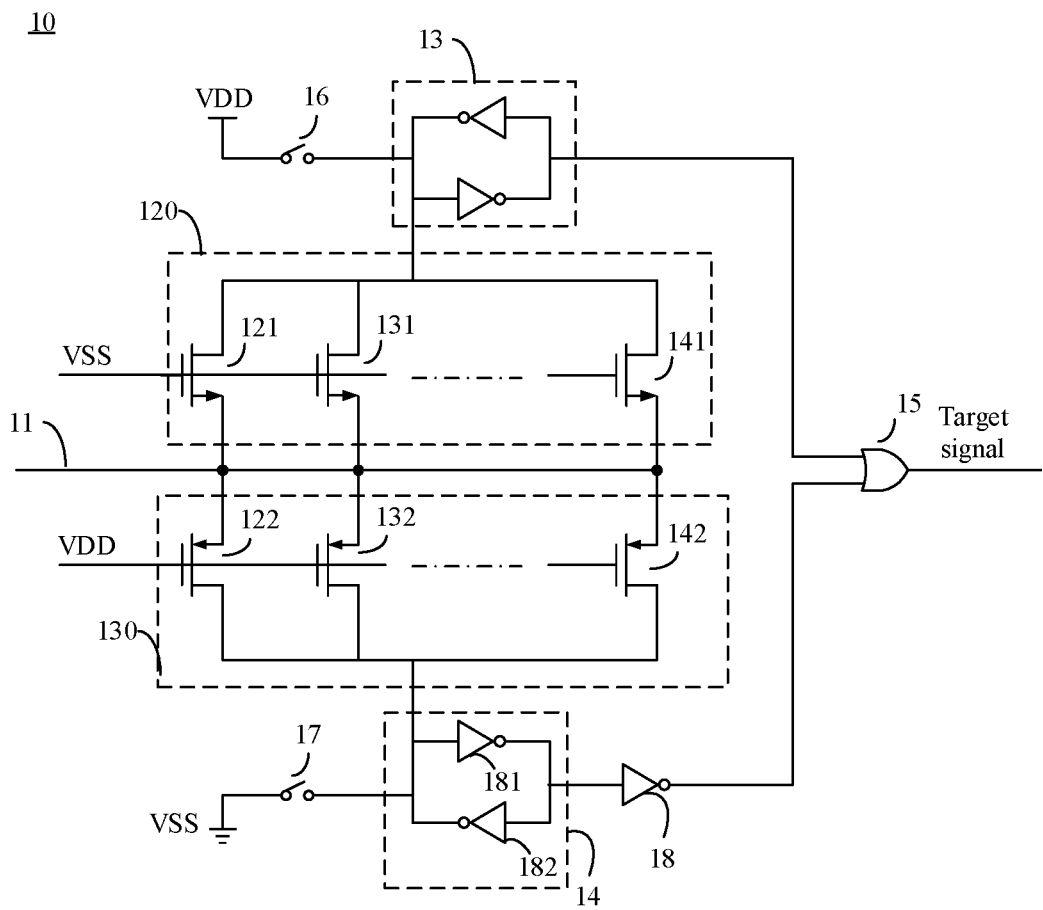
FIG. 2 is a schematic circuit diagram of a variant structure of the detection circuit shown in FIG. 1.

FIG. 2 is a schematic circuit diagram of a specific embodiment of the detection circuit shown in FIG. 1.

With reference to FIG. 2, the detection circuit 10 may further include a first switch 16.

For example, the input end of the first latch 13 is connected to the power supply voltage VDD through the first switch 16 to ensure that the input end of the first latch is in a high voltage state. For example, before the first NOMS transistor 121 is turned on, the voltage at the input end of the first latch 13 is equal to the power supply voltage by turning on the first switch 16.

In some other embodiments of the present disclosure, a drain end of a second group of MOS transistors 130 of the at least one group of MOS transistors is connected to an input end of a second latch of the at least one latch, a gate end of the second group of MOS transistors 130 is connected to a power supply voltage, and the input end of the second latch is connected to a ground voltage. The second group of MOS transistors 130 may be configured to detect whether an abnormal phenomenon that a voltage value is higher than a power supply voltage occurs in the shielding layer 11.

With continuing reference to FIG. 1, in an example that the second group of MOS transistors 130 include a first PMOS transistor 122, a gate of the first PMOS transistor 122 is connected to the power supply voltage, a source of the first PMOS transistor 122 is connected to the shielding layer 11, and a drain end of the first PMOS transistor 122 is connected to a second latch 14.

It is assumed that there is electromagnetic fault injection in the shielding layer 11. The shielding layer 11 may generate an induced current so that a voltage of the shielding layer 11 changes, thereby causing that a voltage range of the shielding layer 11 exceeds VSS~VDD. In this case, if a difference between the voltage of the shielding layer 11 and the VDD is greater than or equal to a threshold voltage of the first PMOS transistor 122, the first PMOS transistor 122 is turned on, thereby causing that a voltage at an input end of the second latch 14 increases. The increase of the voltage at the input end of the second latch 14 causes a decrease of a voltage at an output end of the second latch 14. The signal output module 15 outputs the first target signal for indication according to a voltage change at the output end of the second latch 14, so as to indicate that there is electromagnetic fault injection in the shielding layer 11.

With continuing reference to FIG. 2, the detection circuit 10 may further include a second switch 17.

For example, the input end of the second latch 14 is connected to the ground voltage through the second switch 17 to ensure that the input end of the second latch 14 is in a ground voltage state before the first PMOS transistor 122 is turned on. For example, before the first PMOS transistor 122 is turned on, the voltage at the input end of the second latch 14 is equal to the ground voltage by turning on the second switch 17.

With continuing reference to FIG. 2, the detection circuit 10 may further include a first inverter 18.

For example, the output end of the second latch 14 is connected to the input end of the signal output module 15 through the first inverter 18, and the signal output module 15 is configured to generate and output the target signal based on a voltage change at an output end of the first inverter 18. Therefore, when the signal detection circuit 10 includes both the first group of MOS transistors 120 and the second group of MOS transistors 130, the target signal is generated by detecting a rising edge of the first latch 13 and a rising edge of the first inverter 18, which avoids detecting the rising edge of the first latch 13 and a falling edge of the second latch 14 at the same time, thereby reducing complexity of the signal output module 15.

With continuing reference to FIG. 2, the second latch 14 may include a second inverter 181 and a third inverter 182. An input end of the second inverter 181 is connected to an output end of third inverter 182, and an output end of the second inverter 181 is connected to an input end of the third inverter 182. The drain end of the second group of MOS transistors 130 may be connected to the input end of the second inverter 181. The output end of the second inverter 181 is connected to the signal output module 15.

It should be noted that each group of MOS transistors of the at least one group of MOS transistors may include only one MOS transistor, or a plurality of MOS transistors, which is not specifically limited in the embodiment of the present disclosure. For example, with continuing reference to FIG. 1, the first group of MOS transistors 120 may include only the first NMOS transistor 121, and the second group of MOS transistors 130 may include only the first PMOS transistor 122. For another example, with continuing reference to FIG. 2, the first group of MOS transistors 120 may further include a second NMOS transistor 131 and a third NMOS transistor 141, and the second group of MOS transistors 130 may further include a second PMOS transistor 132 and a third PMOS transistor 142. Certainly, FIG. 1 and FIG. 2 are merely examples of the present disclosure and should not be understood as a limitation to the present disclosure. In other alternative embodiments, the first group of MOS transistors 120 and the second group of MOS transistors 130 may respectively include other numbers of MOS transistors.

In some embodiments of the present disclosure, the shielding layer 11 may include at least one metal wire; and the at least one metal wire is provided with at least one detection node, and the at least one detection node is connected to the input end of the at least one latch through the at least one group of MOS transistors.

In an example of a first metal wire of the at least one metal wire, the first metal wire may be provided with at least one first detection node and/or at least one second detection node. The first group of MOS transistors 120 of the at least one group of MOS transistors is connected to the first latch of the at least one latch through the at least one first detection node, and the second group of MOS transistors 130 of the at least one group of MOS transistors may be connected to the second latch of the at least one latch through the at least one second detection node.

In some embodiments of the present disclosure, drain ends of all MOS transistors in the same group of MOS transistors of the at least one group of MOS transistors are each connected to an input end of the same latch.

For example, drain ends of different groups of MOS transistors of the at least one group of MOS transistors are connected to input ends of different latches. With reference to FIG. 2, drain ends of the first group of MOS transistors 120 may be connected to the input end of the first latch 13, and drain ends of the second group of MOS transistors may be connected to the input end of the second latch 14.

For another example, some group(s) of MOS transistors of the at least one group of MOS transistors are connected to the first latch 13, and the other group(s) of MOS transistors of the at least one group of MOS transistors are connected to the second latch 14. The some group(s) of MOS transistors may include at least one group of MOS transistors with the same MOS transistor type, and the other group(s) of MOS transistors may include at least one group of MOS transistors with the same MOS transistor type. The MOS transistor type of MOS transistors in the some group(s) of MOS transistors and the MOS transistor type of MOS transistors in the other group(s) of MOS transistors may be the same or different, which is not specifically limited in the present disclosure.

In some embodiments of the present disclosure, the at least one group of MOS transistors are a plurality of groups of MOS transistors, and different groups of MOS transistors of the plurality of groups of MOS transistors include different types of MOS transistors.

It should be understood that the different types of MOS transistors include, but are not limited to, an "N-type" MOS transistor (NMOSFET) and a "P-type" MOS transistor (PMOSFET). When the "N-type" MOS transistor and the "P-type" MOS transistor are used as switches, a gate end of the "N-type" MOS transistor (a MOS transistor of which a substrate PN node points inward or a MOS transistor from which a current flows out) is turned on when connected at high level, and is turned off when connected at low level; and a gate end of the "P-type" MOS transistor (a MOS transistor of which a PN node points outward or a MOS transistor into which a current flows) is turned off when connected at high level, and is turned on when connected at low level.

In some embodiments of the present disclosure, the at least one group of MOS transistors include a plurality of different types of MOS transistors.

For example, different types of transistors in the at least one group of MOS transistors are connected to input ends of different latches. With reference to FIG. 2, NMOS transistors in the at least one group of MOS transistors may be connected to the input end of the first latch 13, and drain ends of PMOS transistors in the at least one group of MOS transistors may be connected to the input end of the second latch 14.

Figure 3:
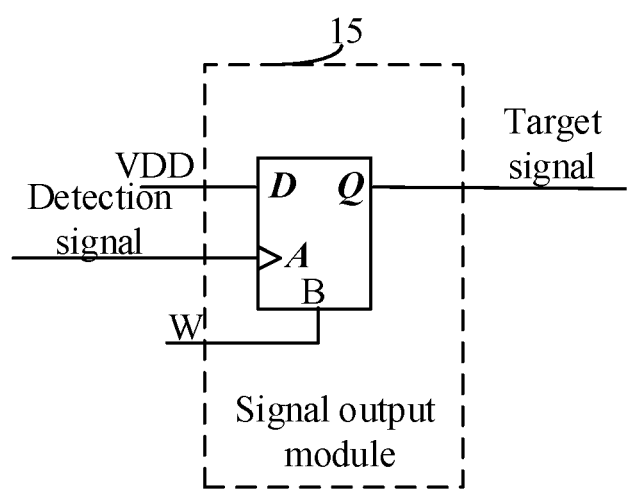
FIG. 3 is a schematic structural diagram of a signal output module according to an embodiment of the present disclosure.

FIG. 3 is a schematic structural diagram of a signal output module according to an embodiment of the present disclosure.

With reference to FIG. 3, the signal output module 15 may be a D flip-flop.

For example, a reset end B of the D flip-flop is connected to a reset signal W. For example, the reset signal W may be a control signal of the first switch 16 or a control signal of the second switch 17. A D end of the D flip-flop is connected to a VDD. A detection end A of the D flip-flop is connected to the output end of the first latch 13 or the output end of the first inverter 18 to receive a detection signal. An output end Q of the D flip-flop outputs a target signal (that is, an alarm signal). Certainly, the signal output module 15 may be another device, such as a comparator.

In some embodiments of the present disclosure, the signal output module 15 may include a first output end and a second output end, and output of the first output end and output of the second output end are inverse. That is, the target signal output by the signal output module 15 may be a differential signal.

Figure 4:
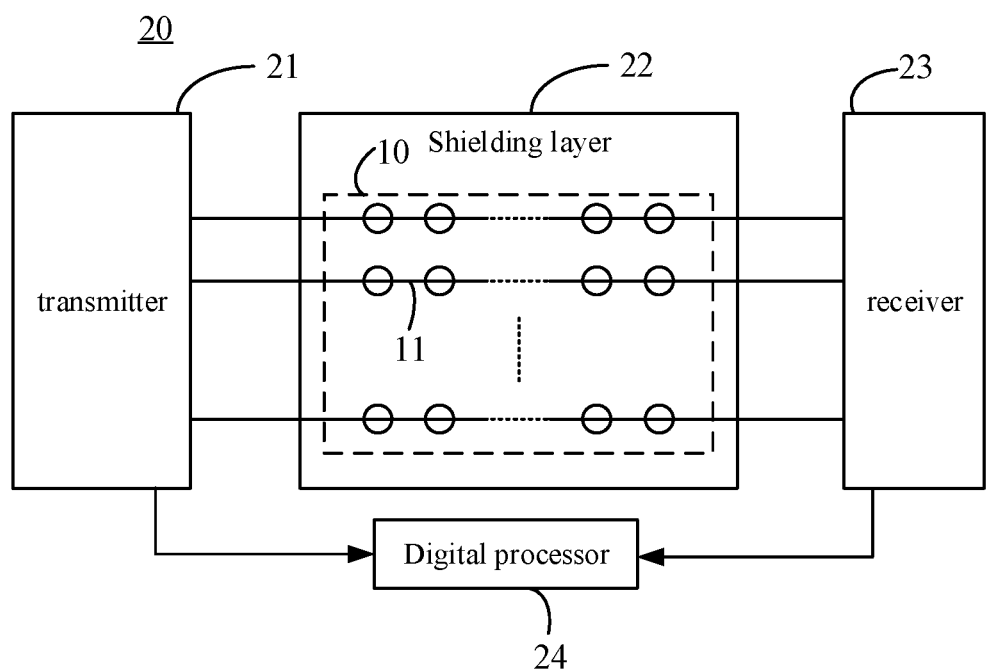
FIG. 4 is a schematic structural diagram of a security chip according to an embodiment of the present disclosure.

FIG. 4 is a schematic structural diagram of a security chip 20 according to an embodiment of the present disclosure.

With reference to FIG. 4, the security chip 20 may include a transmitter 21, a shielding layer 22, a receiver 23 and a digital processor 24.

The shielding layer 22 may be the shielding layer 11 shown in FIG. 1 or FIG. 2. The transmitter 21 is configured to generate and output a first signal. The receiver 22 may be connected to the transmitter 21 through the shielding layer 11. The receiver 23 may be configured to receive the first signal output by the transmitter 21 through the shielding layer 21, and to output a second signal based on the first signal. The digital processor 24 is connected to the transmitter 21 and the receiver 22, respectively. The digital processor 24 may be configured to receive the first signal output by the transmitter 21 and the second signal output by the receiver 23, and to determine whether the shielding layer 11 is damaged (for example, physically damaged) based on the first signal and the second signal.

In other words, the security chip 20 may include a protected chip body circuit, a shielding layer 22 of the chip body circuit, a circuit for detecting whether the shielding layer 22 is damaged, and a detection circuit 10 for detecting whether there is electromagnetic fault injection in the shielding layer 22. The shielding layer 11 may be used as a device or element in the circuit for detecting whether the shielding layer 22 is damaged and the detection circuit 10.

The present disclosure further provides an electronic device, which may include the security chip 20 shown in FIG. 4. The electronic device may include the security chip described above, for example, portable or mobile computing devices such as smartphones, laptops, tablets and gaming devices, and other electronic devices such as electronic databases, automobiles and bank automated teller machines (ATM), which are not limited in the embodiment of the present disclosure.

It should be understood that FIG. 1 to FIG. 4 are merely examples of the present disclosure and should not be understood as a limitation to the present disclosure.

For example, the detection circuit 10 may further include a threshold determination module.

For example, the output end of the at least one latch is connected to the signal output module 15 through the threshold determination module. The threshold determination module is configured to amplify a signal output by the at least one latch, and to transmit the amplified signal to the signal output module 15. For example, the threshold determination module may include a fourth inverter and a fifth inverter. The output end of the at least one latch is connected to one end of the fifth inverter through the fourth inverter, and another end of the fifth inverter is connected to the signal output module 15. An inverting threshold of the fourth inverter may be less than a inverting threshold of the fifth inverter. For example, the inverting threshold of the fourth inverter is 0.3, and the inverting threshold of the fifth inverter is 0.8. That is, sensitivity of the detection circuit 10 is improved by reducing the inverting threshold of the fourth inverter, and stability of the detection circuit 10 is ensured by increasing the inverting threshold of the fifth inverter. It should be understood that the foregoing 0.3 and 0.8 are merely examples, and the present disclosure does not specifically limit the inverting threshold of the fourth inverter and the inverting threshold of the fifth inverter. Through cooperation of the threshold determination module, detection accuracy of electromagnetic fault injection may be improved, and the sensitivity of the detection circuit 10 may be further improved.

In the several embodiments provided in the present disclosure, it should be understood that, the disclosed circuits, branches and modules may be realized in other manners. For example, the branches described above are exemplary, for example, the division of the modules is merely a logic function division, and other division manners may exist in practical implementation, for example, a plurality of modules may be combined or integrated to one branch, or some features may be omitted or not implemented.

If being implemented in the form of a software functional unit and sold or used as a separate product, the integrated module may be stored in a computer-readable storage medium. Based on such understanding, the technical solution of the present disclosure substantially, or the part of the present disclosure making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present disclosure. The foregoing storage medium includes a variety of media capable of storing program codes, such as a USB disk, a mobile hard disk, a read-only memory (ROM), a random access memory (RAM), a magnetic disk, or an optical disk.

Described above are the specific embodiments of the present disclosure only, but the protection scope of the present disclosure is not limited thereto, those skilled who are familiar with the art could readily think of variations or substitutions within the technical scope disclosed by the present disclosure, and these variations or substitutions shall fall within the protection scope of the present disclosure. Therefore, the protection scope of the present disclosure should be determined with reference to the protection scope of the claims.

What is claimed is:

1. A detection circuit of electromagnetic fault injection, comprising:
    a shielding layer configured to shield interference;
    at least one group of metal-oxide semiconductor (MOS) transistors comprising one or a plurality of MOS transistors, wherein a source end of the at least one group of MOS transistors is connected to the shielding layer;
    at least one latch, wherein a drain end of the at least one group of MOS transistors is connected to an input end of the at least one latch; and
    a signal output module, wherein an input end of the signal output module is connected to an output end of the at least one latch, the signal output module is configured to generate and output a target signal based on a voltage change at the output end of the at least one latch, and the target signal is used to indicate whether there is electromagnetic fault injection in the shielding layer;
    wherein when at least one MOS transistor of the at least one group of MOS transistors is turned on, the signal output module is configured to output s first target signal, and the first target signal is used to indicate that there is electromagnetic fault injection in the shielding layer; and when all of the at least one group of MOS transistors are each turned off, the signal output module is configured to output a second target signal, and the second target signal is used to indicate that there is no electromagnetic fault injection in the shielding layer.

2. The detection circuit according to claim 1, wherein a drain end of a first group of MOS transistors of the at least one group of MOS transistors is connected to an input end of a first latch of the at least one latch, a gate end of the first group of MOS transistors is connected to a ground voltage, and the input end of the first latch is connected to a power supply voltage.

3. The detection circuit according to claim 2, wherein the detection circuit further comprises:
    a first switch, wherein the input end of the first latch is connected to the power supply voltage through the first switch.

4. The detection circuit according to claim 1, wherein a drain end of a second group of MOS transistors of the at least one group of MOS transistors is connected to an input end of a second latch of the at least one latch, a gate end of the second group of MOS transistors is connected to a power supply voltage, and the input end of the second latch is connected to a group voltage.

5. The detection circuit according to claim 4, wherein the detection circuit further comprises:
    a second switch; and
    the input end of the second latch is connected to the ground voltage through the second switch.

6. The detection circuit according to claim 5, wherein the detection circuit further comprises:
    a first inverter; and
    an output end of the second latch is connected to the input end of the signal output module through the first inverter, and the signal output module is configured to generate and output the target signal based on a voltage change at an output end of the first inverter.

7. The detection circuit according to claim 1, wherein the shielding layer comprises:
    at least one metal wire; and
    the at least one metal wire is provided with at least one detection node, and the at least one detection node is connected to the input end of the at least one latch.

8. The detection circuit according to claim 1, wherein the at least one group of MOS transistors are a plurality of groups of MOS transistors, and drain ends of different groups of MOS transistors of the plurality of groups of MOS transistors are connected to input ends of different latches.

9. The detection circuit according to claim 1, wherein the at least one group of MOS transistors are a plurality of groups of MOS transistors, and different groups of MOS transistors of the plurality of groups of MOS transistors comprise different types of MOS transistors.

10. The detection circuit according to claim 1, wherein each of the at least one latch comprises:
    a second inverter and a third inverter; and
    an input end of the second inverter is connected to an output end of the third inverter, an output end of the second inverter is connected to an input end of the third inverter, and the input end of the second inverter or the input end of the third inverter is an input end of the latch.

11. The detection circuit according to claim 1, wherein the signal output module comprises a first output end and a second output end, and output of the first output end and output of the second output end are inverse.

12. The detection circuit according to claim 1, wherein the signal output module is a D flip-flop.

13. A security chip, comprising:
    a shielding layer; and
    a detection circuit, comprising:
    at least one group of metal-oxide semiconductor (MOS) transistors comprising one or more MOS transistors, wherein a source end of the at least one group of MOS transistors is connected to the shielding layer;
    at least one latch, wherein a drain end of the at least one group of MOS transistors is connected to an input end of the at least one latch; and a signal output module, wherein an input end of the signal output module is connected to an output end of the at least one latch, the signal output module is configured to generate and output a target signal based on a voltage change at the output end of the at least one latch, and the target signal is used to indicate whether there is electromagnetic fault injection in the shielding layer;

wherein when at least one MOS transistor of the at least one group of MOS transistors is turned on, the signal output module is configured to output s first target signal, and the first target signal is used to indicate that there is electromagnetic fault injection in the shielding layer; and when all of the at least one group of MOS transistors are each turned off, the signal output module is configured to output a second target signal, and the second target signal is used to indicate that there is no electromagnetic fault injection in the shielding layer.

14. The security chip according to claim 13, further comprises:
    a transmitter configured to generate and output a first signal;
    a receiver, wherein the receiver is connected to the transmitter through the shielding layer, and the receiver is configured to receive the first signal output by the transmitter through the shielding layer, and to output a second signal based on the first signal; and
    a digital processor, wherein the digital processor is connected to the transmitter and the receiver, respectively, and the digital processor is configured to receive the first signal output by the transmitter and the second signal output by the receiver, and determine whether the shielding layer is damaged based on the first signal and the second signal.

15. The security chip according to claim 13, wherein a drain end of a first group of MOS transistors of the at least one group of MOS transistors is connected to an input end of a first latch of the at least one latch, a gate end of the first group of MOS transistors is connected to a ground voltage, and the input end of the first latch is connected to a power supply voltage.

16. The security chip according to claim 15, wherein the detection circuit further comprises:
    a first switch, wherein the input end of the first latch is connected to the power supply voltage through the first switch.

17. The security chip according to claim 13, wherein a drain end of a second group of MOS transistors of the at least one group of MOS transistors is connected to an input end of a second latch of the at least one latch, a gate end of the second group of MOS transistors is connected to a power supply voltage, and the input end of the second latch is connected to a group voltage.

18. The security chip according to claim 17, wherein the detection circuit further comprises:
    a second switch; and
    the input end of the second latch is connected to the ground voltage through the second switch.

19. The security chip according to claim 18, wherein the detection circuit further comprises:
    a first inverter; and
    an output end of the second latch is connected to the input end of the signal output module through the first inverter, and the signal output module is configured to generate and output the target signal based on a voltage change at an output end of the first inverter.

20. The security chip according to claim 13, wherein the shielding layer comprises:
    at least one metal wire; and
    the at least one metal wire is provided with at least one detection node, and the at least one detection node is connected to the input end of the at least one latch.

* * * * *